US012440858B2

(12) United States Patent
Li et al.

(10) Patent No.: US 12,440,858 B2
(45) Date of Patent: Oct. 14, 2025

(54) BACKPACK SPRAYER

(71) Applicant: TECHTRONIC CORDLESS GP, Anderson, SC (US)

(72) Inventors: Qi Li, Dongguan (CN); Waifa He, Dongguan (CN); Zhengjun Wang, Dongguan (CN); Hunter Brown, Anderson, SC (US); Spencer Mitchell, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 269 days.

(21) Appl. No.: 18/248,328

(22) PCT Filed: Oct. 9, 2020

(86) PCT No.: PCT/CN2020/119882
§ 371 (c)(1),
(2) Date: Apr. 7, 2023

(87) PCT Pub. No.: WO2022/073170
PCT Pub. Date: Apr. 14, 2022

(65) Prior Publication Data
US 2024/0001384 A1 Jan. 4, 2024

(51) Int. Cl.
*B05B 9/08* (2006.01)
*B05B 12/00* (2018.01)
(Continued)

(52) U.S. Cl.
CPC ........ *B05B 9/0861* (2013.01); *B05B 12/0024* (2018.08); *F04B 17/06* (2013.01); *F04B 23/02* (2013.01)

(58) Field of Classification Search
CPC ... B05B 9/0861; B05B 12/0024; B05B 15/40; B05B 1/3013; B05B 9/0888; F04B 17/06;
(Continued)

(56) References Cited

U.S. PATENT DOCUMENTS 2,692,799 A 10/1954 Parrott
2,719,753 A 10/1955 Parrott
(Continued)

FOREIGN PATENT DOCUMENTS

AU 2020400248 6/2022
CN 201478845 U 5/2010
(Continued)

OTHER PUBLICATIONS

European Search Report Corresponding to Application No. 20956485 on Jun. 14, 2024.
(Continued)

*Primary Examiner* — Vishal Pancholi
(74) *Attorney, Agent, or Firm* — Dority & Manning, P.A.

(57) ABSTRACT

A backpack sprayer is disclosed for dispensing different fluids. The backpack sprayer includes a housing with a bottom face and a dispensing assembly. The housing defines a fluid container, a battery compartment for receiving a battery, and a chamber for receiving a control assembly and a pump assembly. The dispensing assembly can dispense fluid from the fluid container. The pump assembly is configured to pump the fluid from the fluid container to the dispensing assembly. The control assembly is configured to control the pump assembly. The battery compartment is positioned above the bottom face with a first height therebetween, and the control assembly is positioned above the bottom face with a second height therebetween. The control assembly includes a rotatable dial, and the rotatable dial has a coupler for coupling a rotatory movement and a cam surface engaged by a follower for controlling on and off of the pump assembly.

20 Claims, 17 Drawing Sheets

(51) Int. Cl.
*F04B 17/06* (2006.01)
*F04B 23/02* (2006.01)

(58) Field of Classification Search
CPC ...... F04B 23/02; F04B 49/06; F04B 2205/09; F04B 49/02; F16L 33/04; F16L 33/223; A01M 7/0046
See application file for complete search history.

(56) References Cited

U.S. PATENT DOCUMENTS

| | | | | |
|---|---|---|---|---|
| 3,901,449 | A | 8/1975 | Bochmann | |
| 5,752,661 | A * | 5/1998 | Lewis | B05B 9/0888 239/153 |
| 5,924,633 | A | 7/1999 | Brass | |
| 6,705,647 | B1 | 3/2004 | Palmer | |
| 6,769,628 | B1 | 8/2004 | Vaage | |
| 7,260,955 | B1 | 8/2007 | Uranga | |
| 7,611,170 | B2 | 11/2009 | Hillhouse | |
| 9,296,002 | B2 | 3/2016 | Zwahlen et al. | |
| 2005/0006400 | A1 * | 1/2005 | Shapanus | B05B 9/0861 222/1 |
| 2014/0263729 | A1 * | 9/2014 | Stewart | B05B 7/2467 239/154 |
| 2015/0050169 | A1 * | 2/2015 | Horie | B08B 3/026 417/410.1 |
| 2015/0251223 | A1 * | 9/2015 | Horie | B08B 3/026 134/57 R |
| 2018/0154386 | A1 * | 6/2018 | Zhang | B05B 12/002 |
| 2019/0224703 | A1 * | 7/2019 | Gustafson | B05B 9/0888 |
| 2019/0388918 | A1 | 12/2019 | Gustafson et al. | |
| 2021/0323033 | A1 * | 10/2021 | Sugiura | F04B 17/03 |

FOREIGN PATENT DOCUMENTS

| | | | |
|---|---|---|---|
| CN | 102039231 | | 5/2011 |
| CN | 103586157 | A | 2/2014 |
| CN | 104741261 | A | 7/2015 |
| CN | 208535401 | U | 2/2019 |
| CN | 109865613 | A | 6/2019 |
| CN | 110169411 | A | 8/2019 |
| CN | 210607374 | U | 5/2020 |
| CN | 214839112 | | 11/2021 |
| DE | 8621643 | | 3/1989 |
| JP | 2014100114 | A | 6/2014 |
| JP | 2014147356 | A | 8/2014 |
| RU | 76778 | U1 | 10/2008 |
| WO | WO2019197398 | A1 | 10/2019 |

OTHER PUBLICATIONS

International Patent Application No. PCT/CN2020/119882; International Search Report; Jun. 25, 2021; (3 pages).

* cited by examiner

BACKPACK SPRAYER

This application is a National Stage Patent Application of PCT/CN2020/119882, filed on Oct. 9, 2020, the disclosure of which is incorporated by reference herein in its entirety.

TECHNICAL FIELD

The present disclosure generally relates to a battery-powered backpack sprayer, and more particularly to a portable fluid dispenser with improvements for minimizing the risk of fluid leakage and simplifying the adjustment control.

BACKGROUND

Backpack sprayers are used for dispensing different fluids in a wide variety of applications. For example, the backpack sprayers can be used to dispense water, cleaning fluid, sanitizer, weed killer, pesticide, fertilizer, paint, and other fluid to an object or a surface. In general, the backpack sprayers are designed to be worn by the user by securing a tank of the sprayer against the user's back, such that the user can easily carry the tank of fluid from location to location.

A conventional electrical backpack sprayer includes a tank, a battery pack, a pump, a pressure controller on the outlet tube, and a dispensing nozzle. The battery pack is connected to the pump to power the pump, so the liquid in the tank flows through a conduit to the pump, and to the dispensing nozzle for spraying outwardly. The user can use the pressure controller to control the volume of liquid. As the user wears the electrical backpack sprayer with the battery pack, electrical circuits, and liquid tank mounted together, the water sealing and anti-moisture are essential for preventing electrical failure or leakage.

Furthermore, the backpack sprayer is carried on the back, and it is important to simplify the control and adjustment of the fluid flow and pressure. The pressure controller on the outlet tube is a trigger that can control the fluid projection speed, pressure, and spray pattern. For controlling the pump speed and actuating the power of the pump, a more convenient interface is required such that the user can actuate the pump and adjust the pump speed easily.

Accordingly, there is a need in the art for a battery powered backpack sprayer that seeks to address at least some of the above issues. Furthermore, other desirable features and characteristics will become apparent from the subsequent detailed description and the appended claims, taken in conjunction with the accompanying drawings and this background of the disclosure.

SUMMARY OF THE INVENTION

Aspects and advantages of the invention will be set forth in part in the following summary, or may be obvious from the summary, or may be learned through practice of the invention.

In accordance with certain embodiments of the present disclosure, a backpack sprayer is disclosed. The backpack sprayer comprises a housing with a bottom face and a dispensing assembly. The housing defines a fluid container, a battery compartment for receiving a battery, and a chamber for receiving a control assembly and a pump assembly. The dispensing assembly can dispense fluid from the fluid container. The pump assembly is configured to pump the fluid from the fluid container to the dispensing assembly. The control assembly is configured to control the pump assembly. The battery compartment is positioned above the bottom face with a first height therebetween, and the control assembly is positioned above the bottom face with a second height therebetween.

In accordance with a further aspect of the present disclosure, the control assembly includes a rotatable dial, and the rotatable dial has a cam surface engaged by a follower for controlling on and off of the pump assembly.

Preferably, the rotary sensor is selected from a rheostat, a potentiometer, or an angular position sensor.

In accordance with a further aspect of the present disclosure, the control assembly comprises a rotatable dial, and the rotatable dial comprises a coupler for coupling a rotatory movement of the rotatable dial to a rotary sensor for controlling a flow rate of the pump assembly.

In accordance with a further aspect of the present disclosure, the cam surface comprises at least a first surface having a first radius and a second surface having a second radius different from the first radius; the follower moves to a first position when engaging the first surface and opens a switch of the pump assembly; and the follower moves to a second position when engaging the second surface and closes the switch of the pump assembly.

Preferably, the cam surface further comprises a transition surface between the first surface and the second surface.

Preferably, the transition surface achieves an abrupt transition between the first surface and the second surface.

Preferably, the follower is selected from a cantilever or a spring-loaded slider.

In accordance with a further aspect of the present disclosure, the dispensing assembly is in fluid communication with the pump assembly through a threaded connection, the threaded connection comprises a thread connector and a clamp mounted onto the thread connector preventing the thread connector from loosening.

Preferably, the thread connector comprises a plurality of circumferentially arranged protrusions or dents for engaging with a securing feature of the clamp.

Preferably, the securing feature comprises a bent tab.

Preferably, the clamp is a semi-circular tab with one or more mounting ends for mounting the clamp to the housing.

In accordance with a further aspect of the present disclosure, the bottom face comprises one or more drain holes.

In accordance with a further aspect of the present disclosure, the control assembly and the pump assembly are positioned on the opposite ends within the chamber.

In accordance with a further aspect of the present disclosure, the battery compartment comprises a bottom compartment wall lifted from the bottom face of the housing for the first height.

In accordance with a further aspect of the present disclosure, the battery compartment comprises a compartment door with at least an opening at a lower end of the compartment door.

In accordance with a further aspect of the present disclosure, the backpack fluid dispenser further comprising an electronic control unit positioned on top of the battery compartment.

In accordance with a further aspect of the present disclosure, the battery compartment comprises a socket for slidingly receiving a battery in a receiving direction; and contact means for establishing an electrical connection between the battery and the backpack fluid dispenser. The contact means are slidable within the socket along the receiving direction.

Preferably, a spring means is provided between the contact means and the socket to press the contact means against the battery.

Preferably, the contact means are slidable within the socket along to a first extent for electrical connection with a first battery of a first length, and to a second extent for electrical connection with a second battery of a second length.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects and advantages of the present invention are disclosed as illustrated by the embodiments hereinafter.

BRIEF DESCRIPTION OF THE DRAWINGS

The appended drawings contain figures to further illustrate and clarify the above and other aspects, advantages, and features of the present disclosure. It will be appreciated that these drawings depict only certain embodiments of the present disclosure and are not intended to limit its scope. It will also be appreciated that these drawings are illustrated for simplicity and clarity and have not necessarily been depicted to scale. The present disclosure will now be described and explained with additional specificity and detail through the use of the accompanying drawings in which.

DETAILED DESCRIPTION OF THE INVENTION

Figure 1:
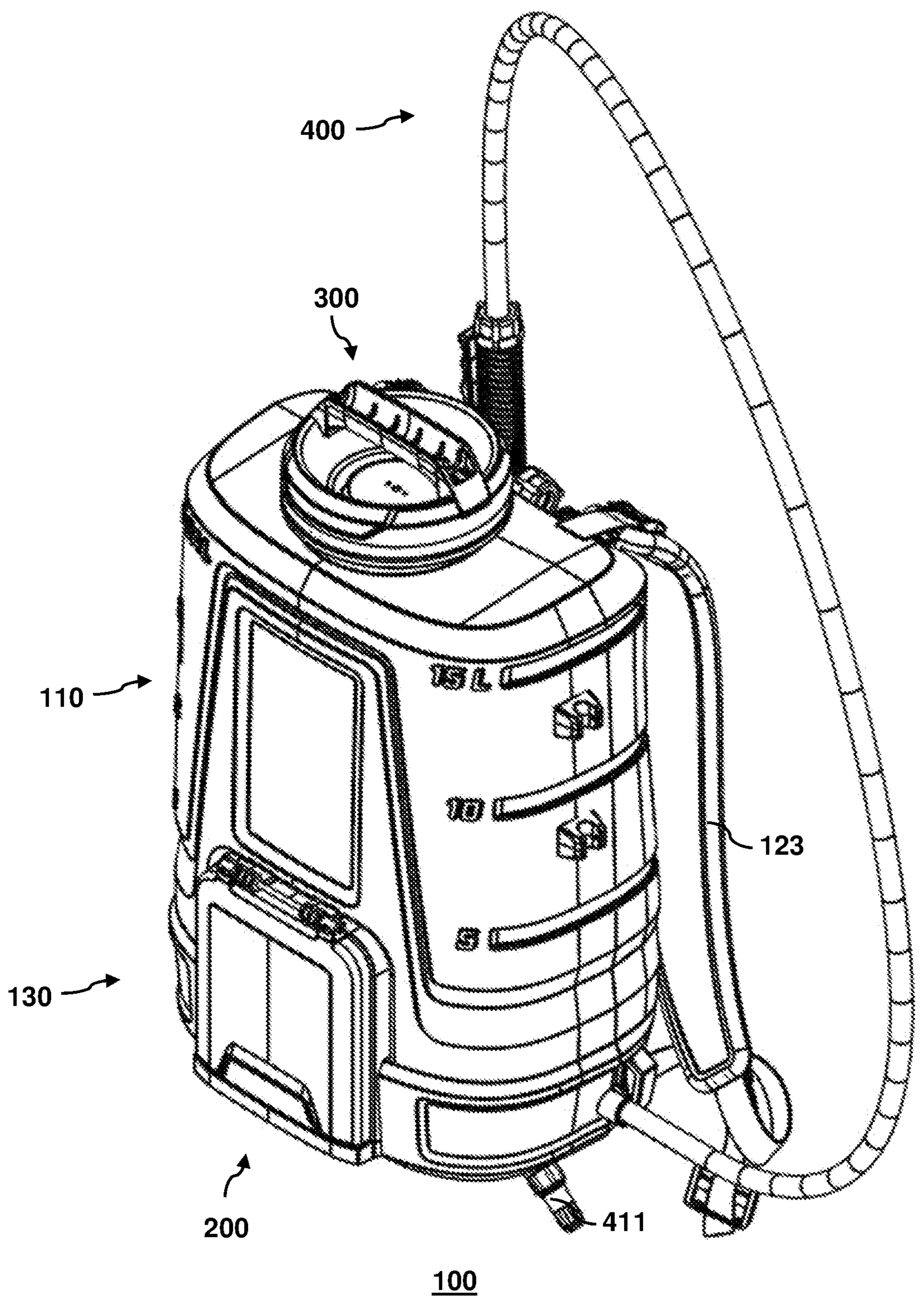
FIG. 1 is a perspective view of a backpack sprayer in accordance with certain embodiments of the present disclosure.
Figure 2:
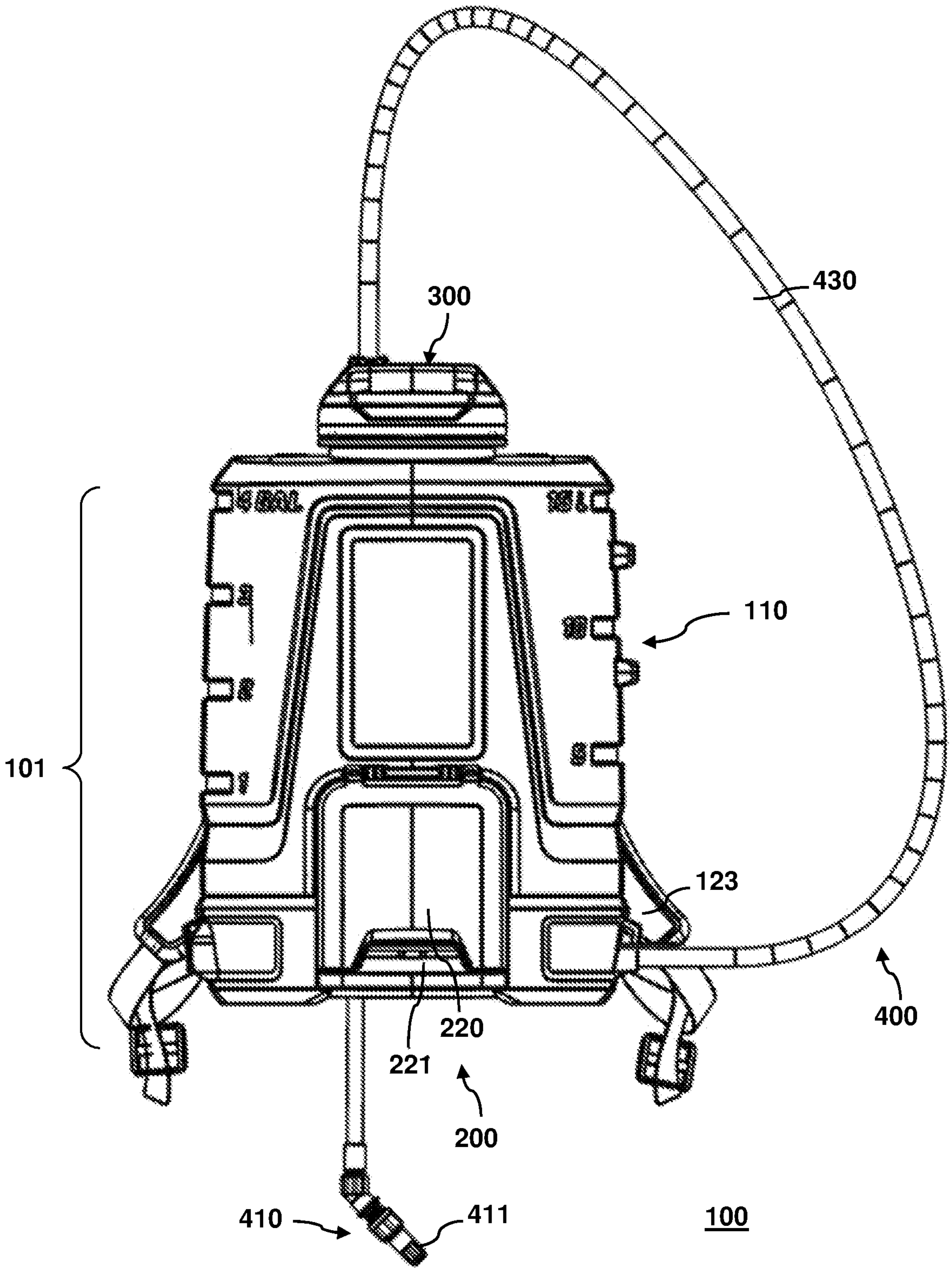
FIG. 2 is a front view of the backpack sprayer of FIG. 1.
Figure 3:
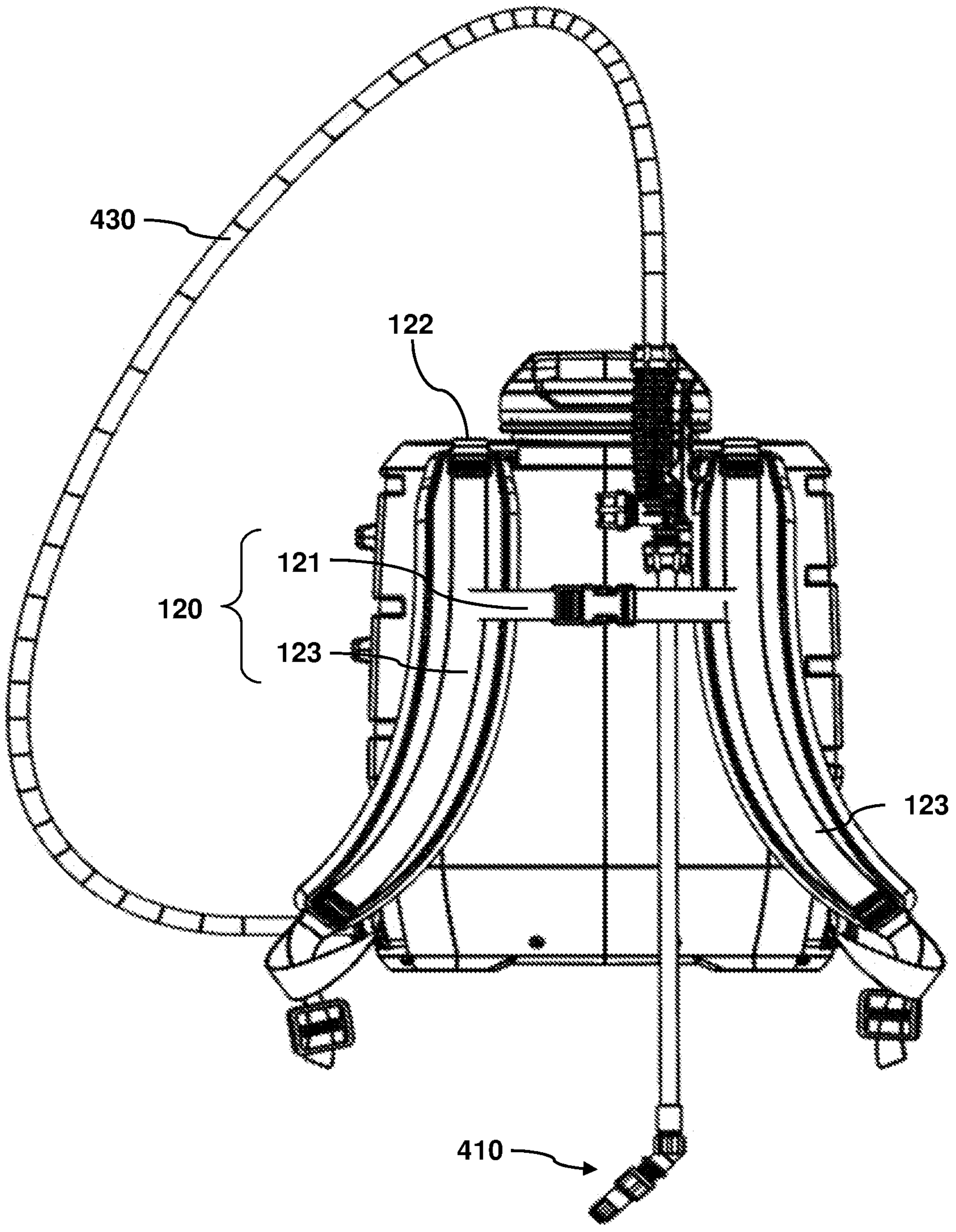
FIG. 3 is a rear view of the backpack sprayer of FIG. 1.
Figure 4:
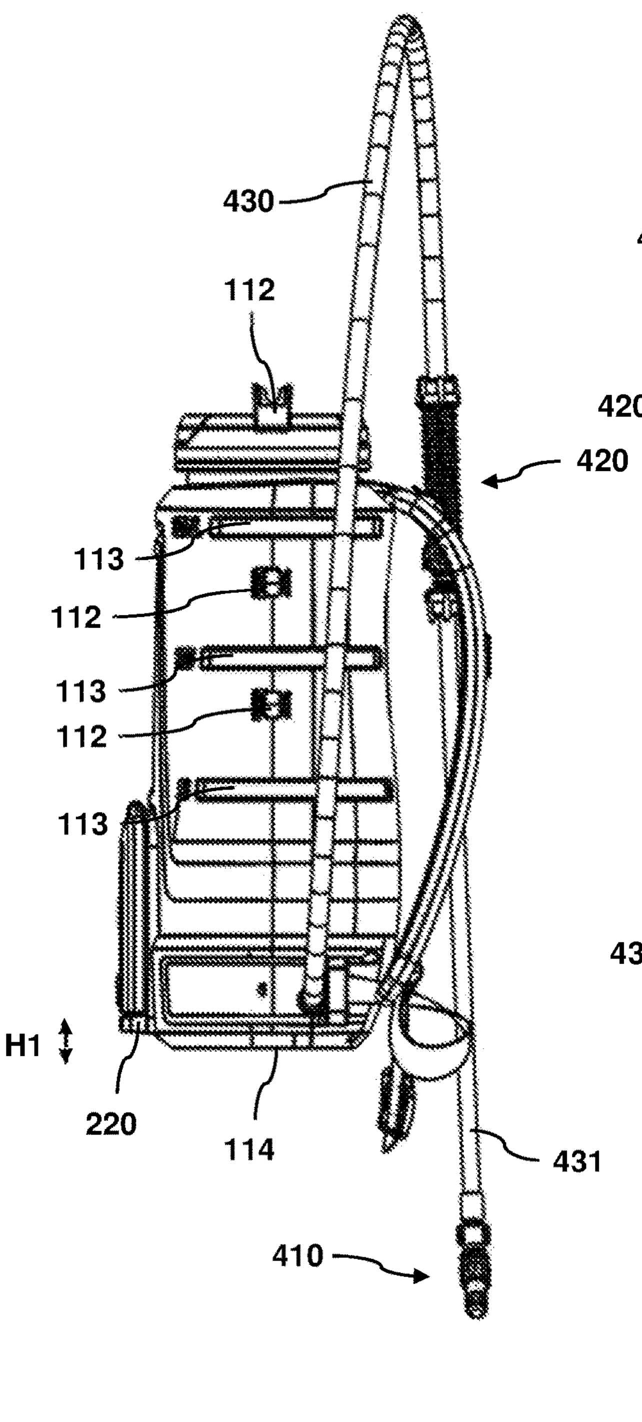
FIG. 4 is a right view of the backpack sprayer of FIG. 1.
Figure 5:
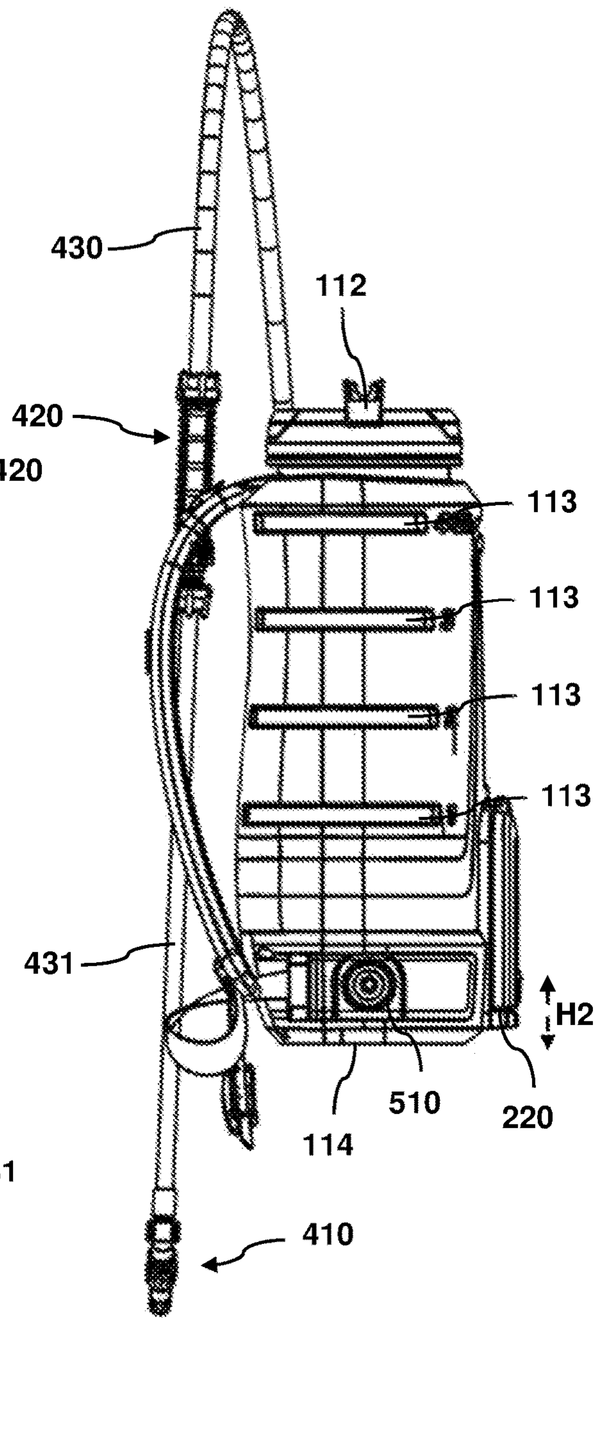
FIG. 5 is a left view of the backpack sprayer of FIG. 1.

The following detailed description is merely exemplary in nature and is not intended to limit the disclosure or its application and/or uses. It should be appreciated that a vast number of variations exist. The detailed description will enable those of ordinary skilled in the art to implement an exemplary embodiment of the present disclosure without undue experimentation, and it is understood that various changes or modifications may be made in the function and structure described in the exemplary embodiment without departing from the scope of the present disclosure as set forth in the appended claims.

The benefits, advantages, solutions to problems, and any element(s) that may cause any benefit, advantage, or solution to occur or become more pronounced are not to be construed as a critical, required, or essential features or elements of any or all of the claims. The invention is defined solely by the appended claims including any amendments made during the pendency of this application and all equivalents of those claims as issued.

Terms such as "upper", "lower", "inner", "outer", "front", "rear", "top", "bottom", "left", "right", and variations thereof are used herein for ease of description to explain the positioning of an element, or the positioning of one element relative to another element, and are not intended to be limiting to a specific orientation or position.

The term "fluid communication" or variations thereof is used to refer to the ability of fluid to move from one part, element, or component to another.

The present disclosure relates to a structure of a backpack sprayer or a fluid dispenser, which is generally designated as 100. More specifically, but without limitation, the present disclosure provides a battery-powered backpack sprayer for dispersing fluid with improvements for minimizing the risk of fluid leakage and simplifying the adjustment control. One having ordinary skill in the art would understand that the current disclosure is also applicable to different battery-operated devices with a fluid pump.

With reference to FIGS. 1-5, there is provided a backpack sprayer 100 comprising a housing 101 and a dispensing assembly 400. The housing defines a fluid container 110, a battery compartment 200, and a chamber 130 for receiving a control assembly 500 and a pump assembly 600 (shown in FIG. 19). In certain embodiments, the fluid container 110 is a storage tank mounted above the chamber 130 for carrying water or other liquid chemicals for dispensing, such as cleaning fluid, sanitizer, weed killer, pesticide, fertilizer, paint, and other fluid. The fluid container 110 may be constructed using light weight and durable materials which show excellent resistance to a wide range of chemicals, such as synthetic resin and polyester resin. In certain embodiments, the fluid container 110 is transparent or semi-transparent, and on the sidewalls of the fluid container 110, a plurality of volume indicators 113 are provided to indicate the amount of fluid contained in the fluid container 110. The volume indicators 113 may indicate the lever in gallons, liters, or other desirable measuring units.

The dispensing assembly 400 is in fluid communication with the fluid container 110 by connecting a hose 430 thereto for dispensing the fluid from the fluid container 110. As illustrated in the figures, the dispensing assembly 400 can be mounted onto the housing 101 by attaching the dispensing assembly 400 to the one or more hose clamps 112. The hose clamp 112 can have any shapes, such as rectangular, round, oval, or other shapes with a cavity sufficient for gripping the hose 430 and securing it thereon.

A support assembly 120 is used for supporting and securing the backpack sprayer 100 on the user's back, such that the user can easily carry from location to location. For this purpose, the support assembly 120 includes one or more shoulder straps 123 secured to the housing 101. As shown in the illustrated embodiment, each shoulder strap 123 is attached to the strap harnesses 122 at locations on the upper face and on the sidewalls of the housing 101. It is apparent that the shoulder strap 123 may be attached to any number of strap harnesses 122, which may be formed integrally and molded as a part of the housing 101. Alternatively, the strap harness 122 may also be glued, bonded, or fastened to the housing 101. The support assembly 120 further comprises a sternum strap 121 attached to the two shoulder straps 123 across the chest of the user, thus the sternum strap 121 can keep the backpack sprayer 100 tightly in place and prevent the shoulder straps 123 from sliding off the shoulders of the user.

The battery compartment 200 receives one or more batteries 210 (shown in FIG. 9) as the power source of the backpack sprayer 100, and is positioned above the bottom face 114 with a first height H1 therebetween. As better illustrated in FIG. 21, the height H1 is provided such that in case of leakage of fluid, for instance from the fluid container 110, the pump assembly 600, or the conduits 640, the leaked liquid can flow to the bottom face 114 and get drained before accumulating to height H1 and enters the battery compartment 200. As such, the need to provide a water proof battery compartment 200 can be dispensed with. The control assembly 500 comprises a rotatable dial 510 and is configured to control the pump assembly 600. The control assembly 500 is positioned above the bottom face 114 with a second height 112 therebetween. Likewise, the height 112 is provided such that in case of leakage of fluid, for instance from the fluid container 110, the pump assembly 600, or the conduits 640, the leaked liquid can flow to the bottom face 114 and get drained before accumulating to height 112 and reaches the electronic circuitries of the control assembly 500. As such, the need to provide a water proof control assembly 500 can be dispensed with. The pump assembly 600 is configured to pump the fluid from the fluid container 110 to the dispensing assembly 400 for fluid dispensing.

Figure 6:
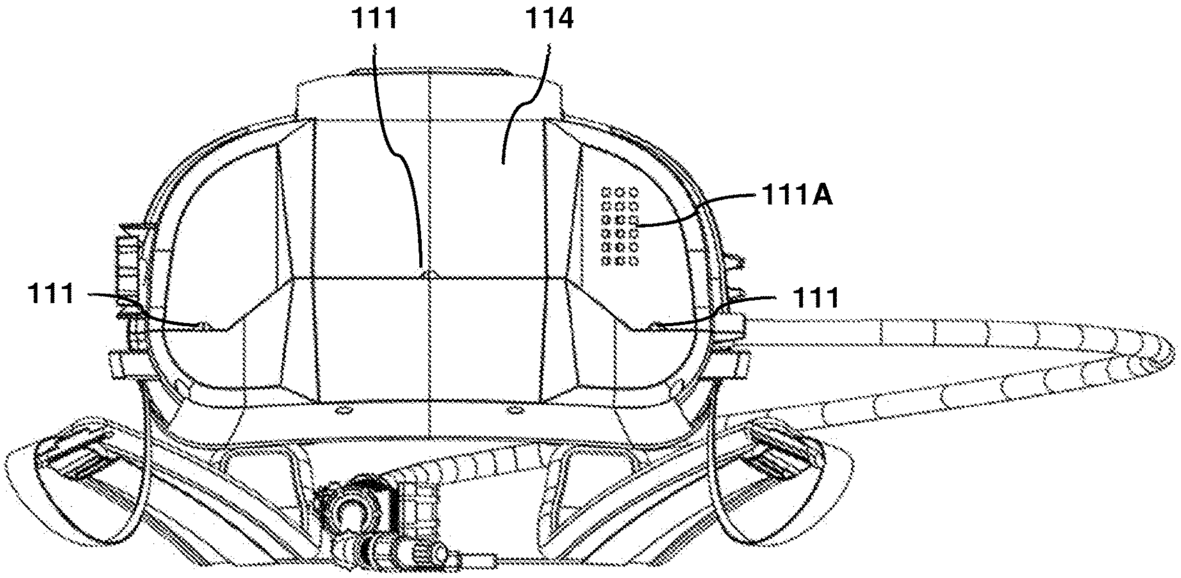
FIG. 6 is a bottom view of the backpack sprayer of FIG. 1.

Referring to FIG. 6, the bottom face 114 of the housing 101 comprises one or more drain holes 111, which are arranged to allow potential fluid leaked from the fluid container 110 or the pump assembly 600 to exit the housing 101. In particular, the one or more drain holes 111 are positioned to allow the fluid dripping to the ground instead of dripping onto the user. There is a matrix of drain holes 111A under the pump assembly 600 for preventing any fluid accumulation within the housing 101.

Figure 7:
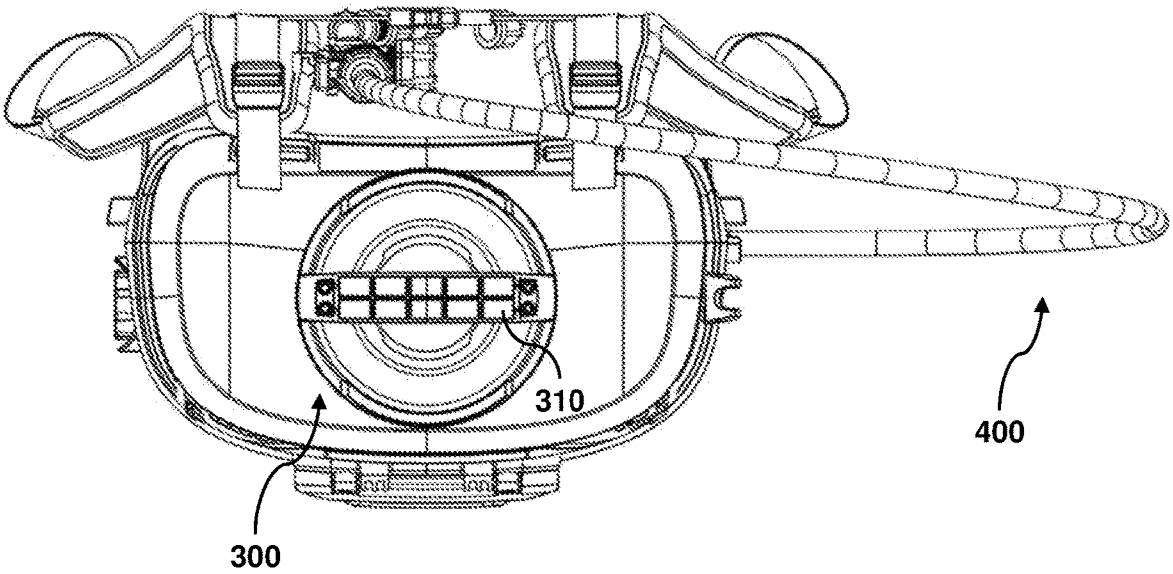
FIG. 7 is a top view of the backpack sprayer of FIG. 1.
Figure 8:
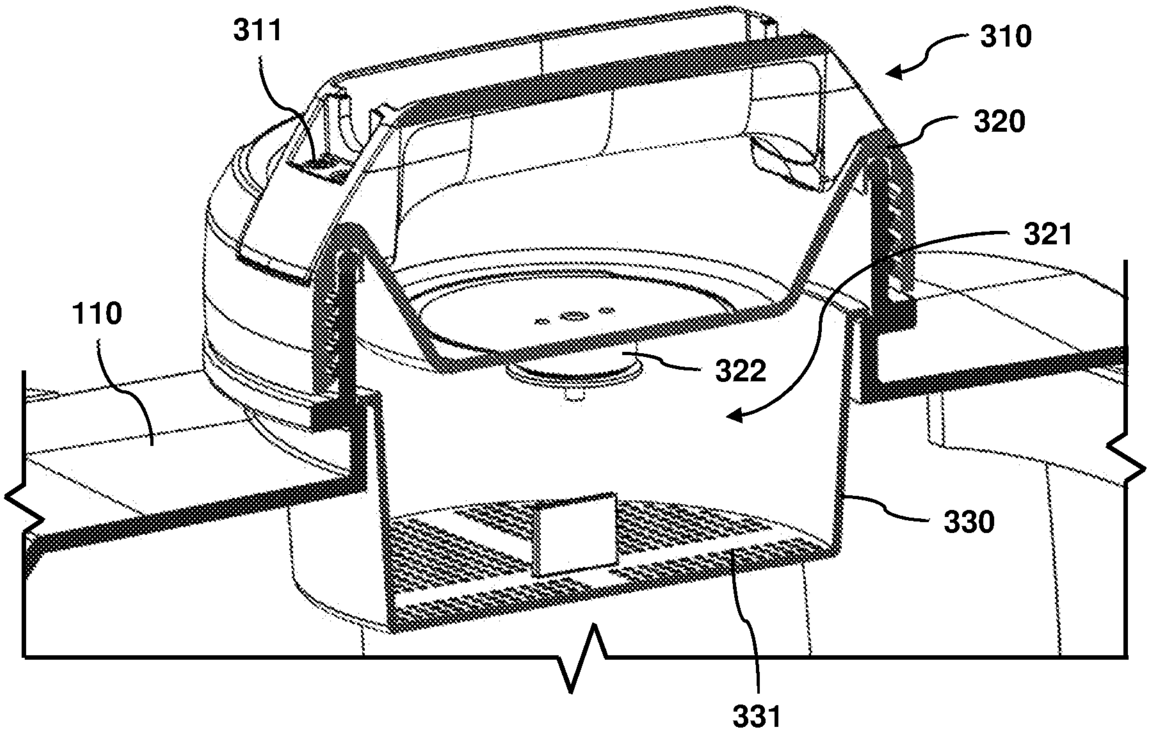
FIG. 8 is a cross-sectional view of the filling port of the backpack sprayer of FIG. 1.

The fluid container 110 can be filled through the filling port 300. In the illustrated embodiment in FIG. 7, the filling port 300 is positioned above the fluid container 110, and it is apparent that the filling port 300 may also be positioned at any sidewalls of the fluid container 110 without departing from the scope and spirit of the present disclosure. Referring to the cross-sectional view of the filling port 300 in FIG. 8, it is adapted to prevent fluid leakage from above when the lid 320 is closed. The lid 320 comprises a lid handle 310 fixed to the lid 320 using one or more screws 311, fasteners, bolts, or other fastening means. The lid 320 is a screw cap that can be installed atop the fluid container 110 for sealing the opening 321 and preventing leakage of the fluid from the opening 321. In certain embodiments, the lid 320 may comprise a check valve 322 that is installed into the lid 320. The check valve 322 allows air to flow into the fluid container 110 to balance the pressure therein as fluid is drawn from the fluid container 10. On the other hand, the check valve 322 prevents fluid from leaking out as the backpack sprayer 100 is tilted. The check valve 322 can be selected from a duckbill valve, an umbrella valve or other suitable valves. Covering the opening 321, there is provided an inlet filter 330 in certain embodiments. The inlet filter 330 has pores 331 of predetermined pore size installed on the opening 321 of the fluid container 110. In certain embodiments, the handle 310 may be formed integrally in the lid 320, and the lid 320 may be mounted onto the filling port 300 by other fastening means.

Figure 9:
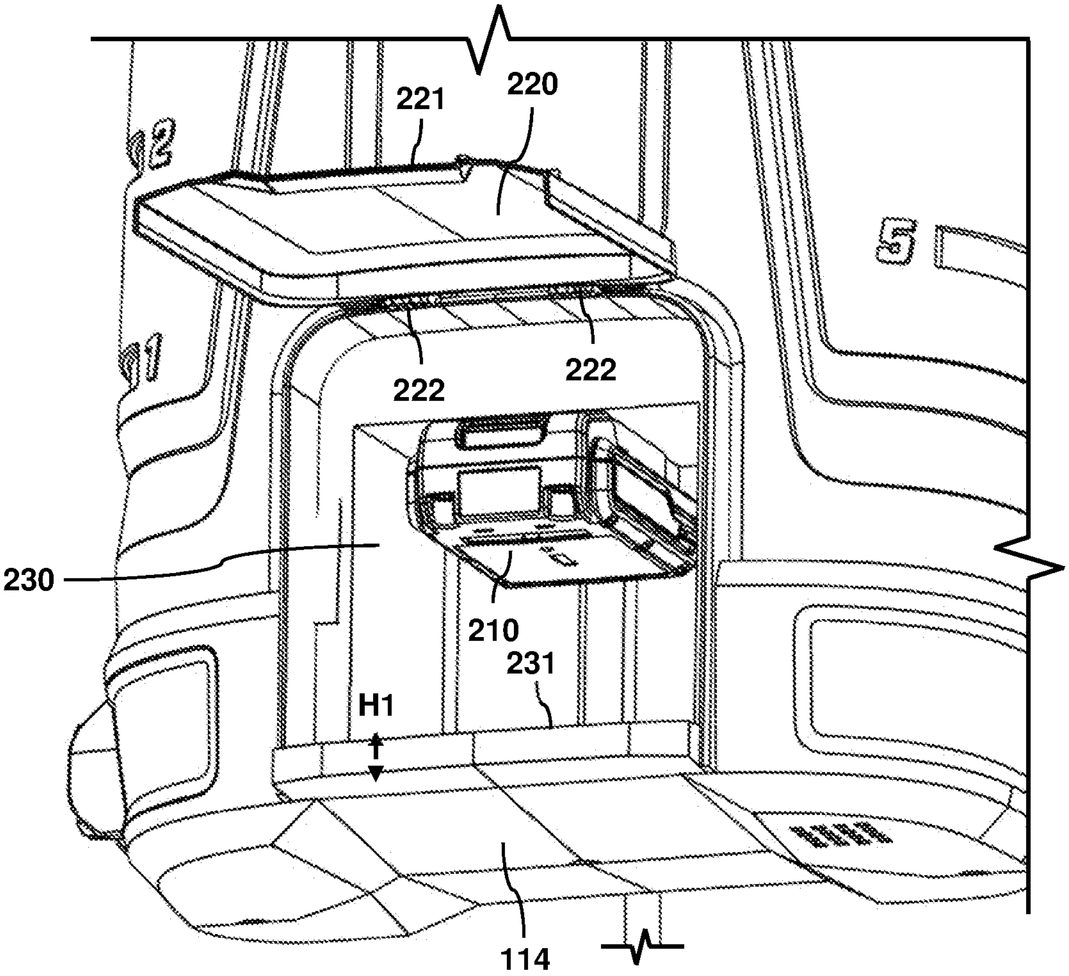
FIG. 9 is a perspective view of the battery compartment of the backpack sprayer of FIG. 1 when the cover is opened.

As shown in FIG. 9, the battery compartment 200 for receiving a battery 210, comprises a compartment door 220 pivotally mounted to the door pivots 222 and connected to one side of the battery compartment 200, such that the battery compartment 200 may be opened or closed from the lower end by lifting the compartment door 220, as exemplarily illustrated. Alternatively, the battery compartment 200 may be opened from either the left or right side, or from the upper side. The compartment door 220 is used to prevent the battery 210 from being exposed to the outside and protecting the battery 210 from accidental damage. In certain embodiments, the compartment door 220 has at least an opening 221 at a lower end of the compartment door 220. In case any fluid is leaked to the battery compartment 200, the fluid can be dripped out from the opening 221. The battery compartment 200 comprises a bottom compartment wall 231 lifted from the bottom face 114 of the housing 101 for the first height H1. In certain embodiments, on the bottom compartment wall 231, there is provided one or more drain holes 111 arranged to allow potential fluid leaked from the fluid container 110 or the pump assembly 600 to exit the battery compartment 200, and minimize any moisture built inside the battery compartment 200.

Figure 10:
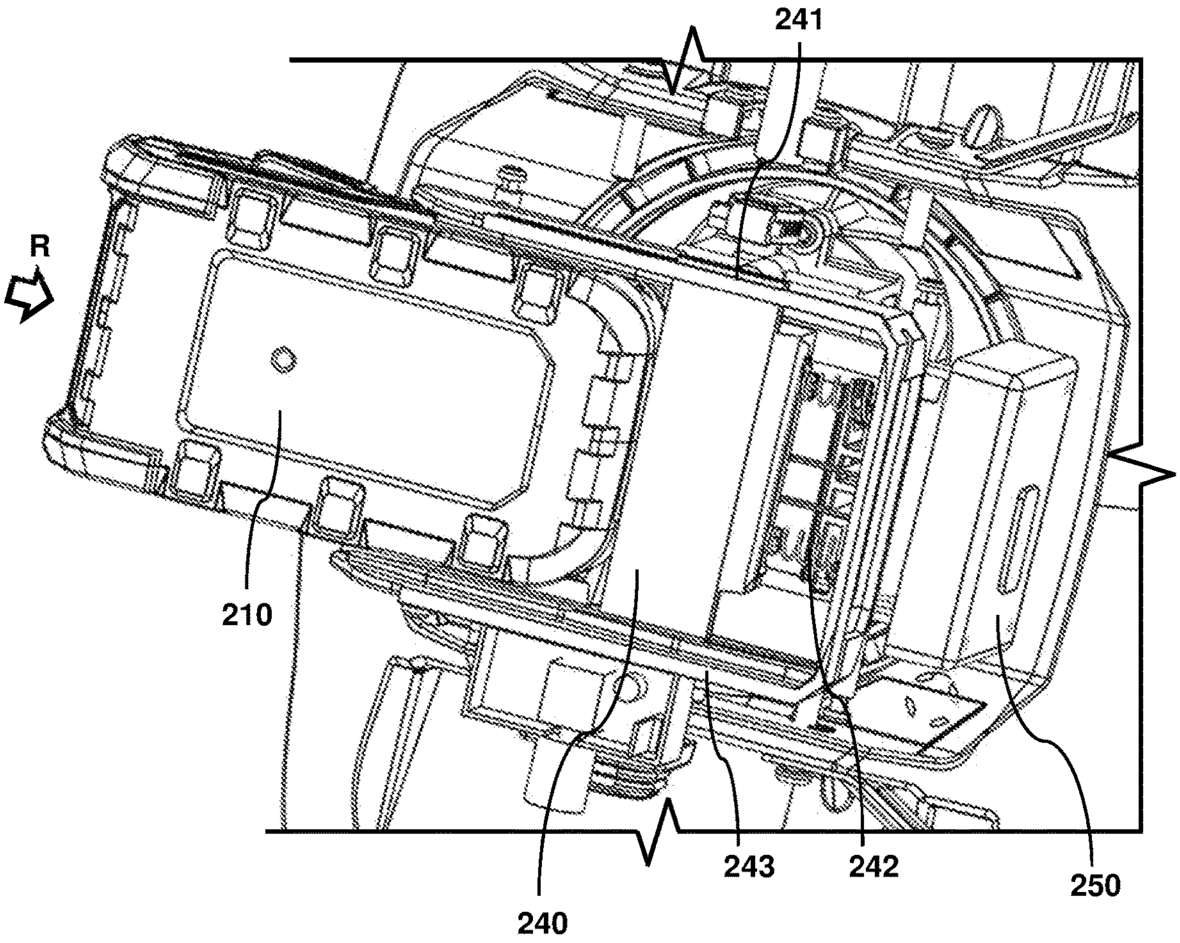
FIG. 10 is a bottom perspective view of the battery mounted to a slidable contact means of the backpack sprayer of FIG. 1.
Figure 11:
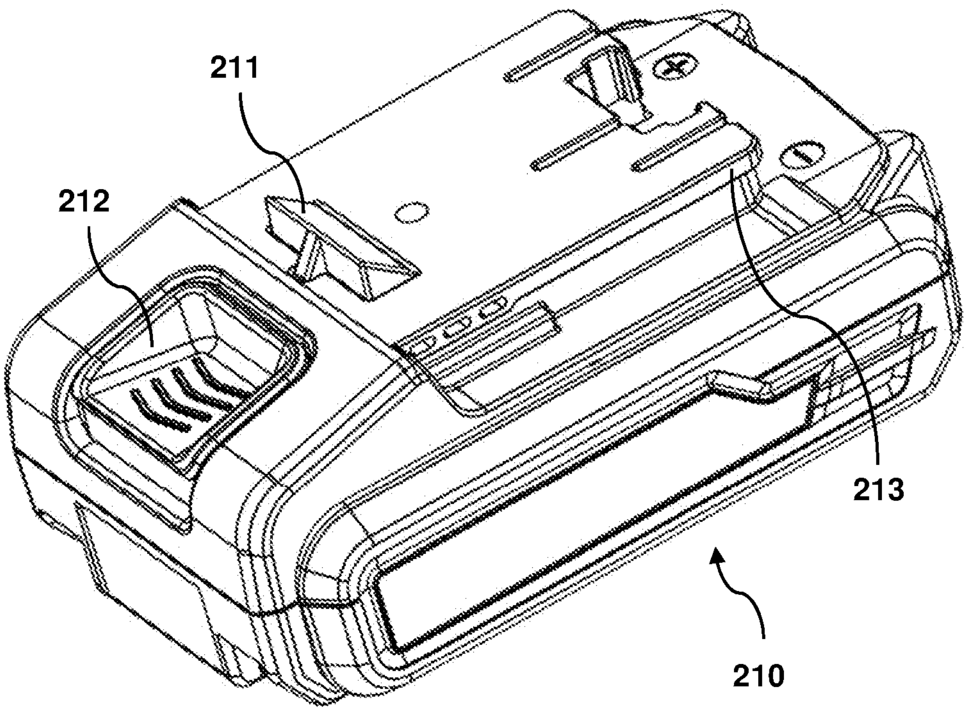
FIG. 11 is a perspective view of an exemplary battery that can be inserted into the backpack sprayer of FIG. 1.

In certain embodiments, as shown in FIG. 10, the battery compartment 200 comprises a socket 243 for slidingly receiving a battery 210 in a receiving direction R. Contact means 240 are provided in the socket 243 for establishing an electrical connection between the battery 210 and the backpack fluid dispenser 100. In certain embodiments, the contact means 240 is slidable within the socket 243 along the receiving direction R. The battery 210 is pressed against the contact means 240 when the battery 210 is slid into the socket 243. The socket 243 comprises one or more grooves 241 for receiving the one or more guide rails 213 of the battery 210, which is detailed in the perspective view of the battery 210 in FIG. 11. Therefore, when sliding the battery 210 into the socket 243, the one or more guide rails 213 is aligned with the one or more grooves 241 of the socket 243 such that the battery 210 can be pressed into the socket 243 to complete electric connections with the contact means 240. Spring means 242 are provided between the contact means 240 and the socket 243 to slide and press the contact means

240 against the battery 210. The battery 210 comprises a latch 211 and a latch switch 212 coupled to the latch 211. The latch 211 is adapted to mount the battery 210 to the socket 243.

As the contact means 240 is slidable within the socket 243 along the receiving direction R, the backpack sprayer 100 of the present disclosure is compatible with batteries of different capacities, and therefore different sizes and lengths. When a battery 210 is received in the socket 243, the socket 243 receives the latch 211 of battery 210 always at the same location. Given that different batteries may have different lengths, the electrical interface of a first battery and the electrical interface of a second battery may extend in the socket 243 to different extents. For example, the contact means 240 are slidable within the socket 243 along to a first extent for electrical connection with the first battery of a first length, and to a second extent for electrical connection with the second battery of a second length. The slidable contact means 240 makes sure the contact means 240 can slide along the socket 243 such that the electrical interface of the contact means 240 can always contact the electrical interface of the first battery or the second battery, thereby establishing electrical connection.

Figure 20:
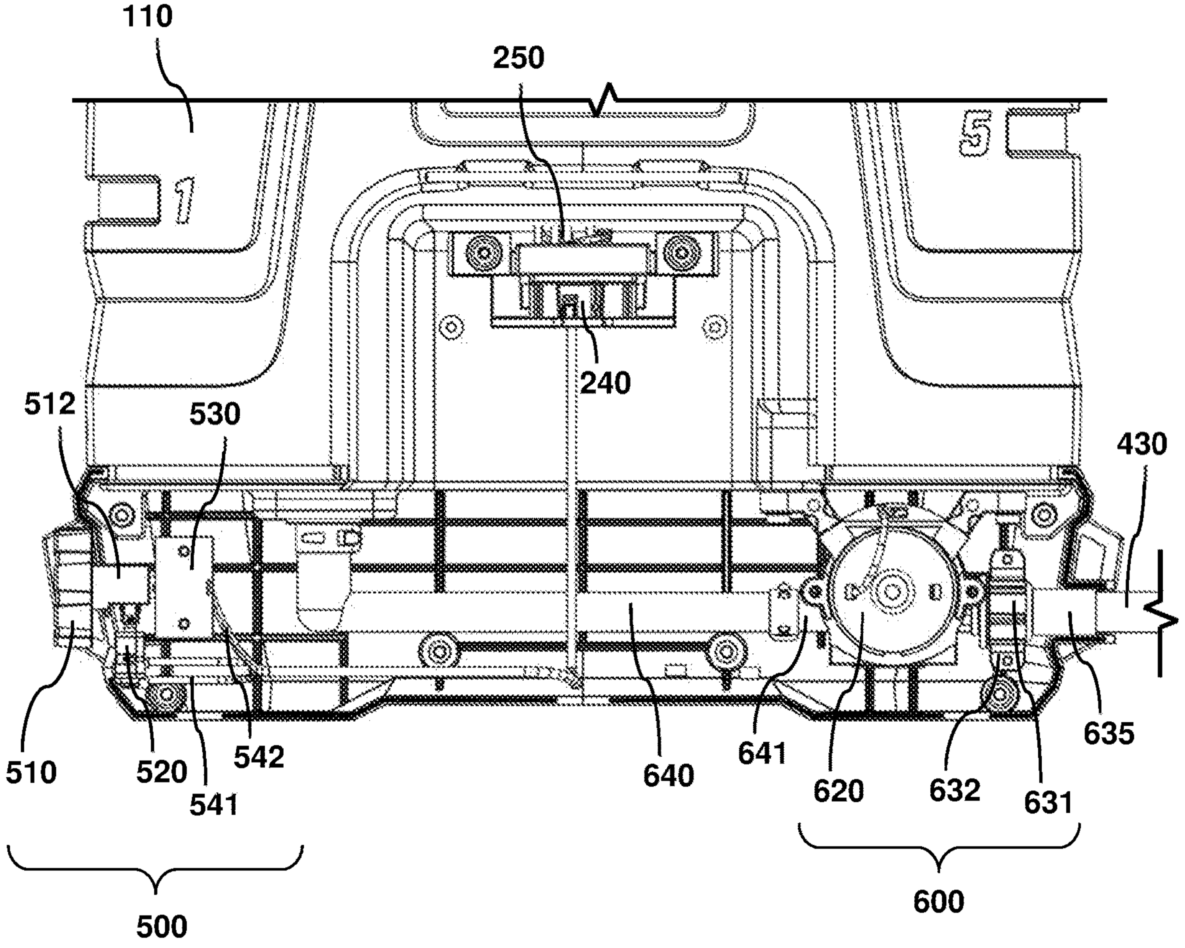
FIG. 20 is an internal front view of the chamber under the fluid container showing the control assembly and the pump assembly of the backpack sprayer of FIG. 1.

An electronic control unit 250 is positioned on top of the battery compartment 200, which is away from the bottom compartment wall 231 to avoid any impact to the electronic control unit 250 in case of fluid leakage. This is shown in FIG. 20. In certain embodiments, the electronic control unit 250 may provide indicators to indicate the status of the battery 210, the pump speed, the operation mode, or other information. In certain embodiments, the electronic control unit 250 further includes a power switch and a pressure switch. However, when operating the backpack sprayer 100, the housing 101 is worn by the user at the back. As a result, it is inconvenient and impracticable for the user to adjust the power switch and the pressure switch directly. A control interface 500 that is accessible by the user when operating the backpack sprayer 100 is needed, and desirably, the control interface 500 should allow the user to control both the power and the flow volume of the pump assembly 600 conveniently.

Figure 12:
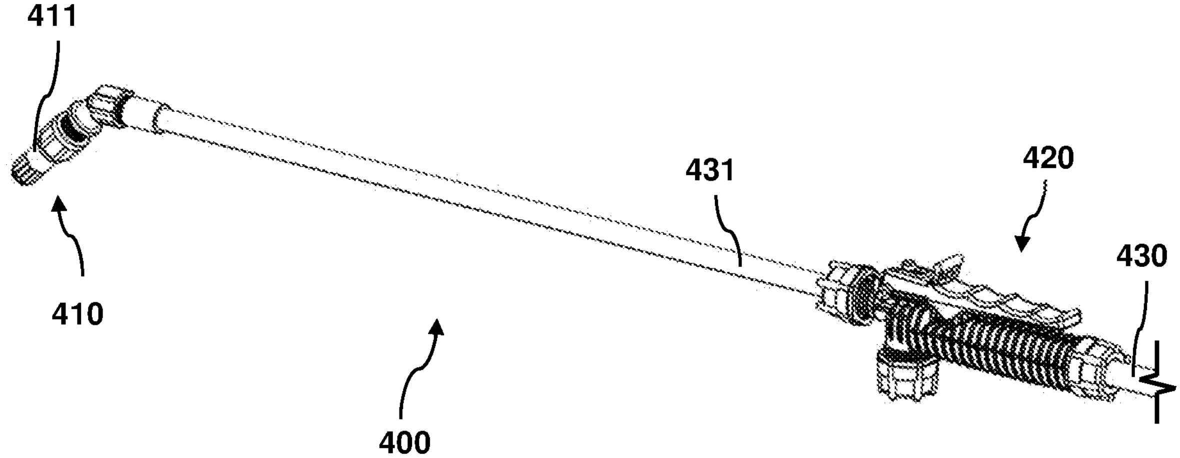
FIG. 12 is a perspective view of the dispensing assembly of the backpack sprayer of FIG. 1.

Referring to FIG. 12, the dispensing assembly 400 comprises a hose 430, a wand 431, a nozzle 410 connected to the wand 431, and a trigger assembly 420 connected between the wand 431 and the hose 430. The nozzle 410 has a nozzle tip 411 adjustable to control the size of the outlet orifice for changing the spray pattern.

Figure 13:
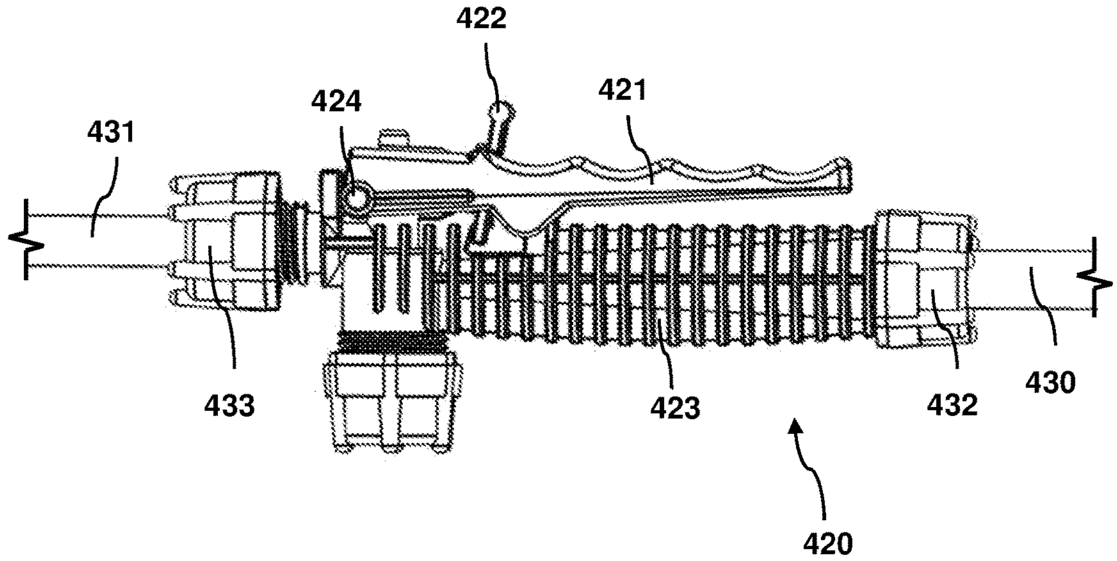
FIG. 13 is a side view of the trigger assembly of the dispensing assembly of FIG. 12.
Figure 14:
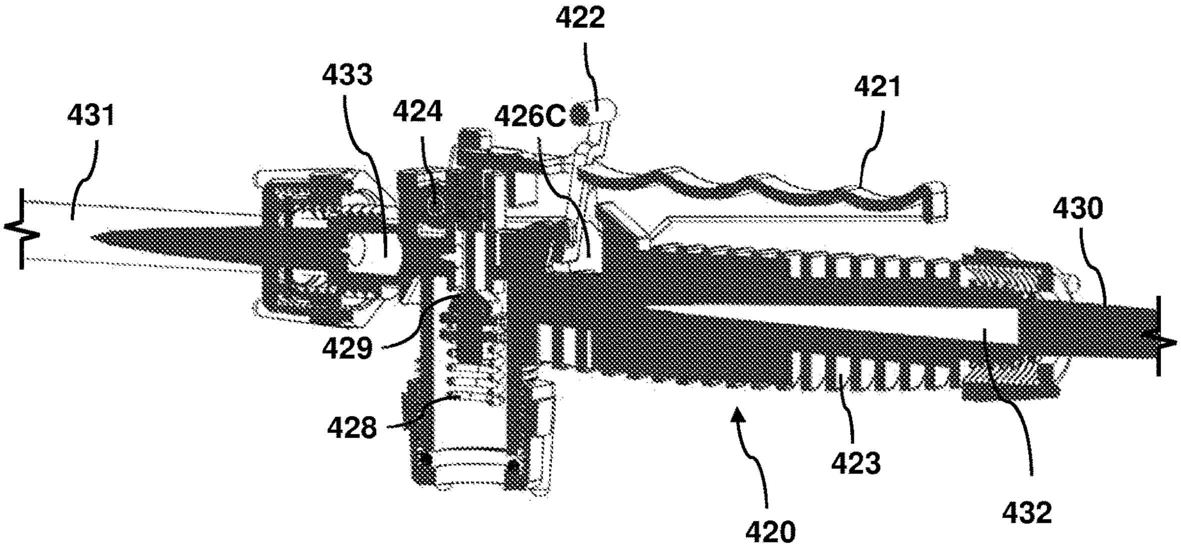
FIG. 14 is a cross-sectional view of the trigger assembly of FIG. 13.
Figure 15:
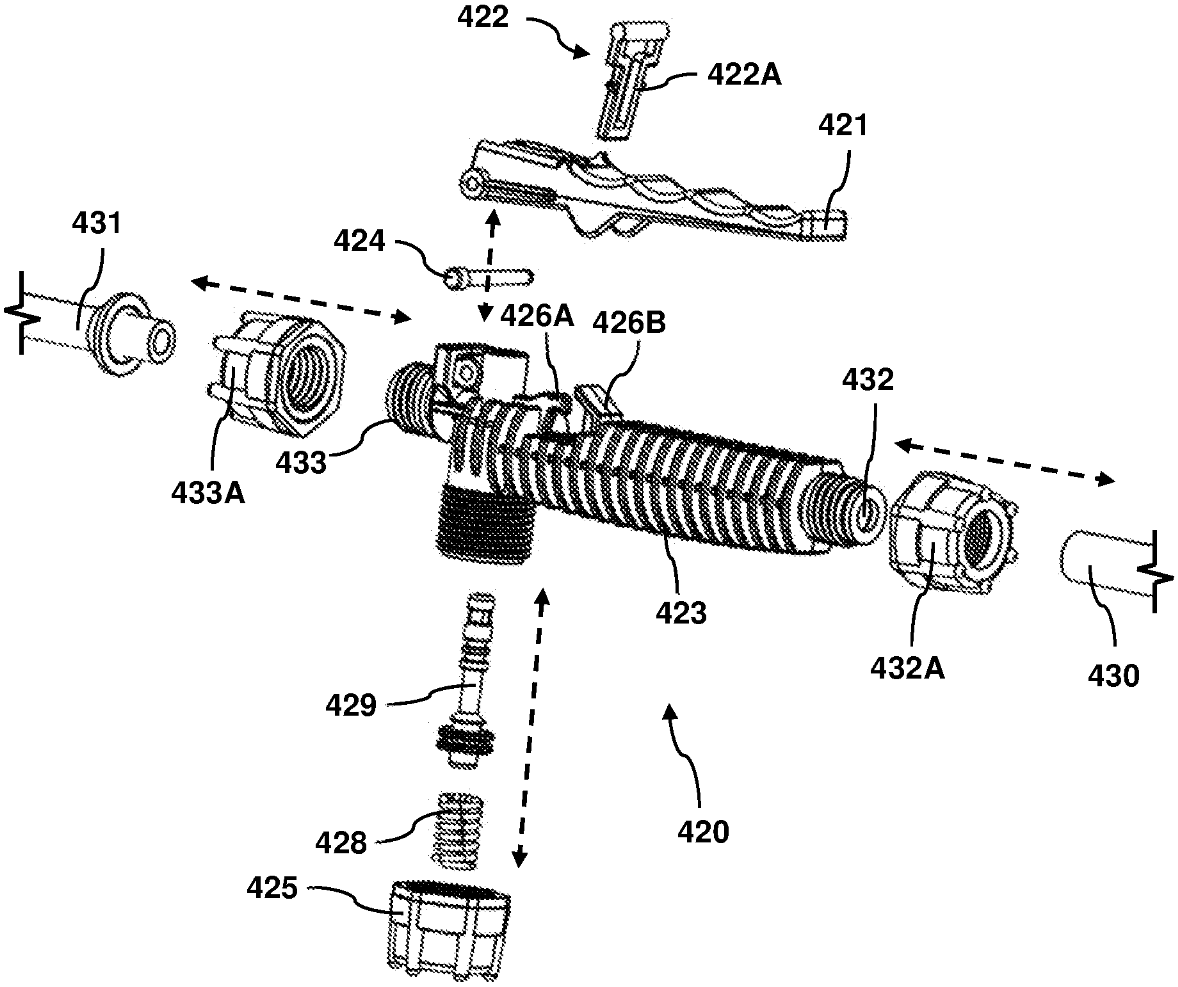
FIG. 15 is an exploded view of the trigger assembly of FIG. 13.

As shown in FIGS. 13-15, the trigger assembly 420 comprising a plunger 429, a handle 423, a trigger 421 coupled to the plunger 429, a locking member 422, an inlet thread 432A, an outlet thread 433A, and a spring 428. The trigger 421 is pivoted about a pin 424 for controlling the vertical position of the plunger 429, which is engaged to control a projection speed of the fluid passing through the trigger assembly 420. The spring 428 surrounds at least part of the plunger 429 at one end. On the other end, the spring 428 can be abutted and compressed against the end cap 425 for providing a torsion force pushing the plunger 429 up. The trigger assembly 420 is engaged to the hose 430 by the inlet thread 432A, and on the other end, connected to the wand 431 by the outlet thread 433A. When the plunger 429 is opened, the inlet area 432 is in fluid communication with the nozzle area 433, thereby the fluid from the fluid container 110 flows across the trigger assembly 420 for dispensing from the nozzle 410. Likewise, when the plunger 429 is closed, the inlet area 432 is separated from the nozzle area 433 and the fluid cannot be dispensed from the nozzle 410.

Figure 16:
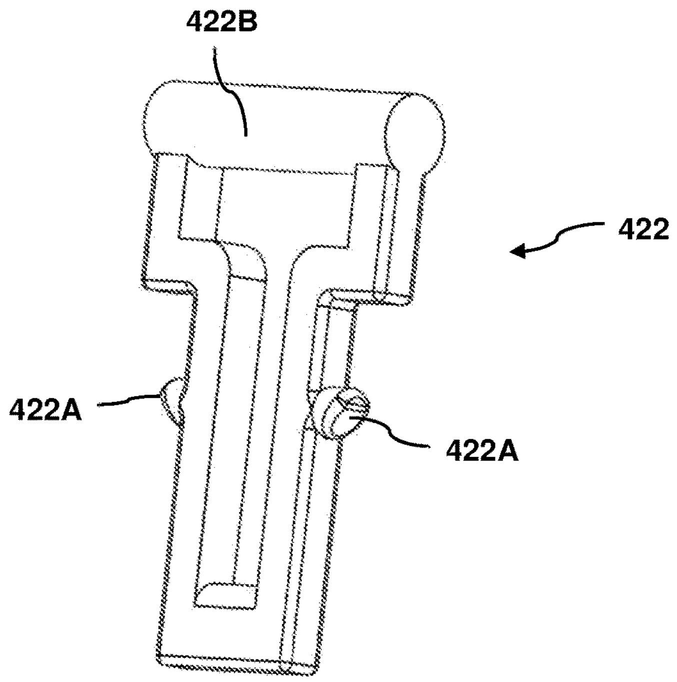
FIG. 16 is a perspective view of the locking member of the trigger assembly of FIG. 13.
Figure 17:
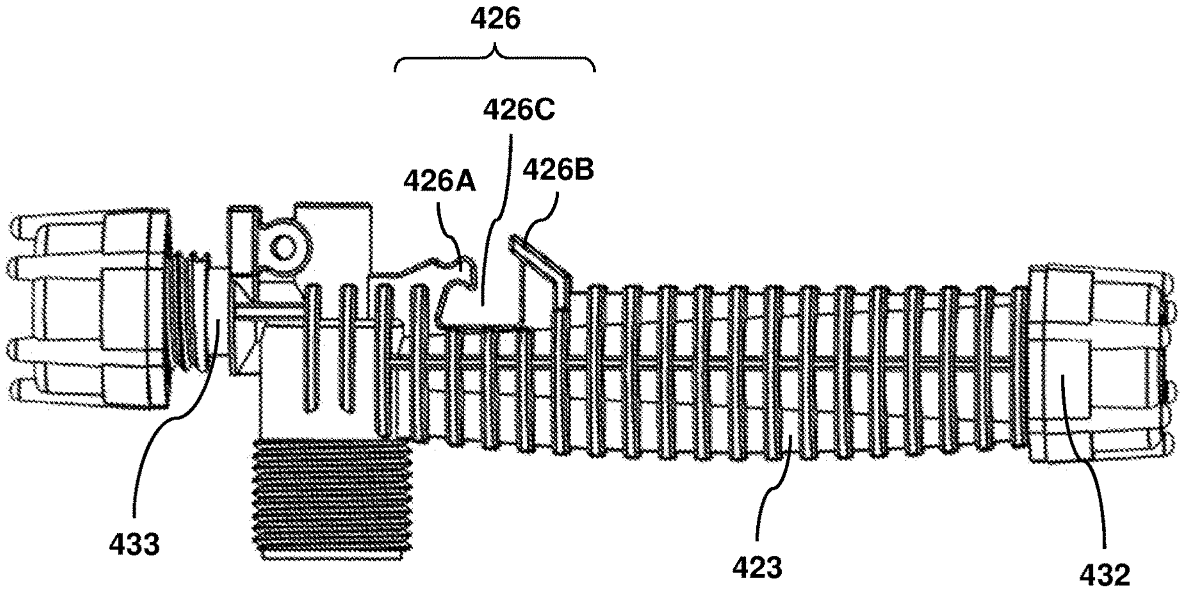
FIG. 17 is a side view of the handle of the trigger assembly of FIG. 13.

The locking member 422 is exemplarily shown in FIG. 16, comprising a horizontal end 422B and a plurality of pivots 422A. The locking member 422 is pivotably mounted onto the lock assembly 426 of the handle 423. The lock assembly 426 is illustrated in FIG. 17. The locking member 422 can be pivoted across the cavity 426C to a first tip 426A, or to a second tip 426B. When the locking member 422 is pivoted to the first tip 426A, the trigger 421 is allowed to move for adjusting the projection speed. When the locking member 422 is pivoted to the second tip 426B, the trigger 421 is prohibited from moving for fixing the projection speed. Therefore, the user can fix the project speed constant throughout using the locking member 422.

Figure 18:
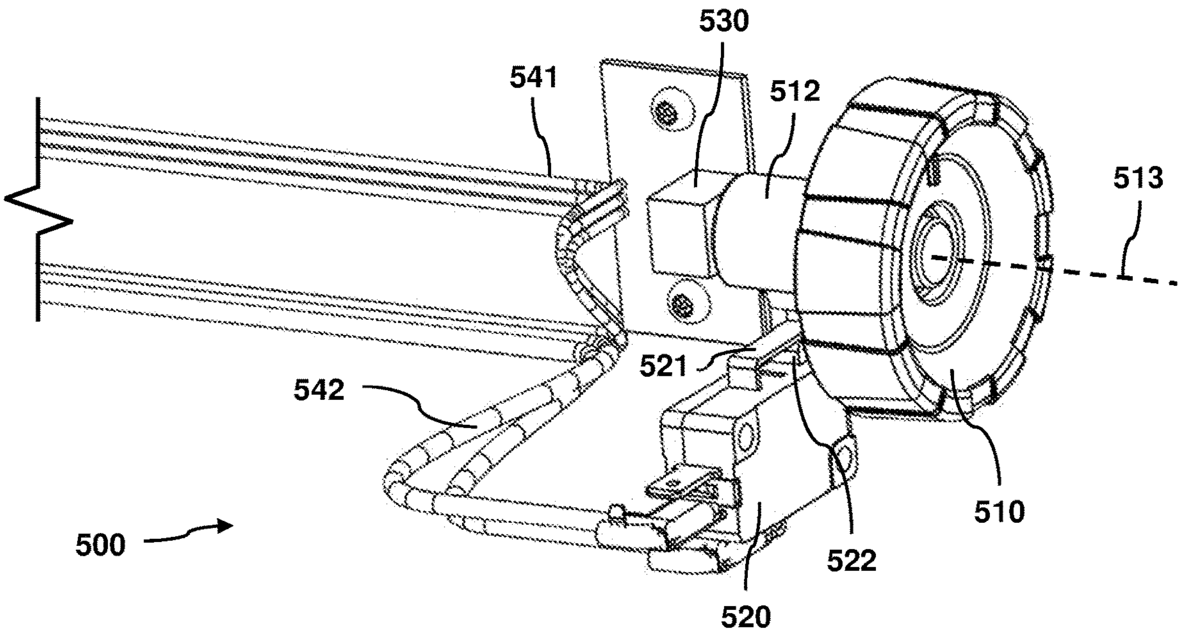
FIG. 18 is an internal view of the control assembly of the backpack sprayer of FIG. 1.

On the lower end of the housing 101, there is provided the chamber 130 for receiving the control assembly 500 and the pump assembly 600. The internal structure of the control assembly 500 is shown in FIG. 18. As discussed already, a control assembly 500 that is accessible by the user when operating the backpack sprayer 100 is needed. The control assembly 500 comprises a rotatable dial 510, a rotary sensor 530, and a switch 520. The rotatable dial 510 is positioned on a sidewall of the housing 101 for the user to turn. The rotatable dial 510 may have the shape of a wheel with a radial dimension sufficient for the user to hold onto, preferably with a knurled rim for providing a better grip as illustrated. In certain embodiments, the rotatable dial 510 may be provided in other shapes, such as a star shape, an octagonal shape, a cylinder shape, or a rectangular shape. The rotatable dial 510 can control the on and off of the pump assembly 600 by opening or closing the switch 520 of the pump assembly 600. The rotatable dial 510 can also control a flow rate of the pump assembly 600. A plurality of electric wires 541, 542 are connected from the rotary sensor 530 and the switch 520 respectively to the pump assembly 600 and battery compartment 200.

Figure 19:
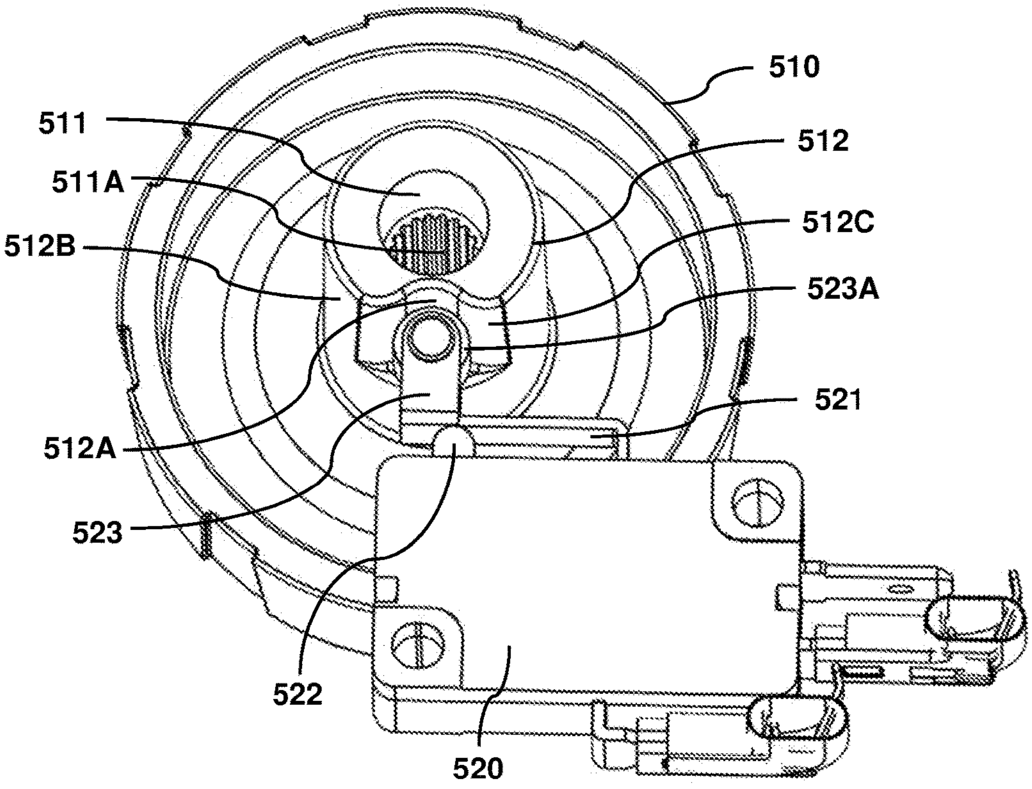
FIG. 19 is an internal view of the cam surface of the rotatable dial engaged with the follower in the control assembly of FIG. 18.

Referring to FIG. 19, the rotatable dial 510 is rotatable around an axis 513 and comprises a coupler 511 and a cam surface 512 provided on the periphery of the coupler 511. The coupler 511 can be a projection affixed to the rear side of the rotatable dial 510. The rotatable dial 510 may have a larger radial dimension than the coupler 511. The coupler 511 is configured to couple a rotatory movement of the rotatable dial 510 to a rotary sensor 530 for controlling a flow rate of the pump assembly 600. In certain embodiments, the coupler 511 has a mounting hole with internal gear teeth 511A for engaging the rotary sensor 530. As another example, the coupler 511 may be connected to the rotary sensor 530 using fasteners, bolts, threads, or other attaching means (not shown). In certain embodiments, the rotary sensor 530 is selected from a rheostat, a potentiometer, an angular position sensor, or any other devices capable of varying resistance or a voltage level in an electrical circuit.

The cam surface 512 is provided around the coupler 511 and is engaged by a follower 523 for controlling on and off of the pump assembly 600. The cam surface 512 comprises at least a first surface 512A and a second surface 512B. The first surface 512A has a first radius, and the second surface 512B has a second radius different from the first radius. The follower 523 follows the cam surface 512 and moves towards or away from the axis 513 when the rotatable dial 510 is rotated. In certain embodiments, the follower 523 moves to a first position when engaging the first surface 512A and opens the switch 520 of the pump assembly 600, thereby the pump assembly 600 is prohibited from operating. The follower 523 moves to a second position when engaging the second surface 512B and closes the switch 520 of the pump assembly 600, thereby the pump assembly 600 is allowed to operate. For the transition between the first surface 512A and the second surface 512B, the cam surface 512 further comprises a transition surface 512C. In certain embodiments, the transition surface 512C achieves an abrupt transition between the first surface 512A and the second surface 512B, so that the operator can clearly feel whether the follower 523 is at the first position or the second position.

In the illustrated embodiment, the follower 523 comprises a roller 523A on a first end for engaging with the cam surface 512. It is apparent that the follower 523 may alternatively comprise a ball bearing, a knife-edge, or other structures on the first end for contacting the cam surface 512. On the second end, the follower 523 engages the actuator 522 of the switch 520 to close the switch 520 or disengage the actuator 522 to open the switch 520. Thereby the pump assembly 600 can be turned on or off. As shown in the illustrated embodiment, the follower 523 is connected to one end of a cantilever 521. The other end of the cantilever can be fixed to the switch 520 or other structure. Alternatively, the follower 523 may be a spring-loaded slider or other suitable configuration (not shown). Therefore, a retention force pushes the follower 523 towards the cam surface 512. For turning the rotatable dial 510 to turn on the pump assembly 600, the user is required to overcome the retention force such that the follower 523 moves from the first surface 512A, along the transition surface 512C to the second surface 512B. Likewise, for turning the rotatable dial 510 to turn off the pump assembly 600, the user is required to turn the rotatable dial 510 such that the follower 523 moves from the second surface 512B, and slides across the transition surface 512C to the first surface 512A.

Figure 21:
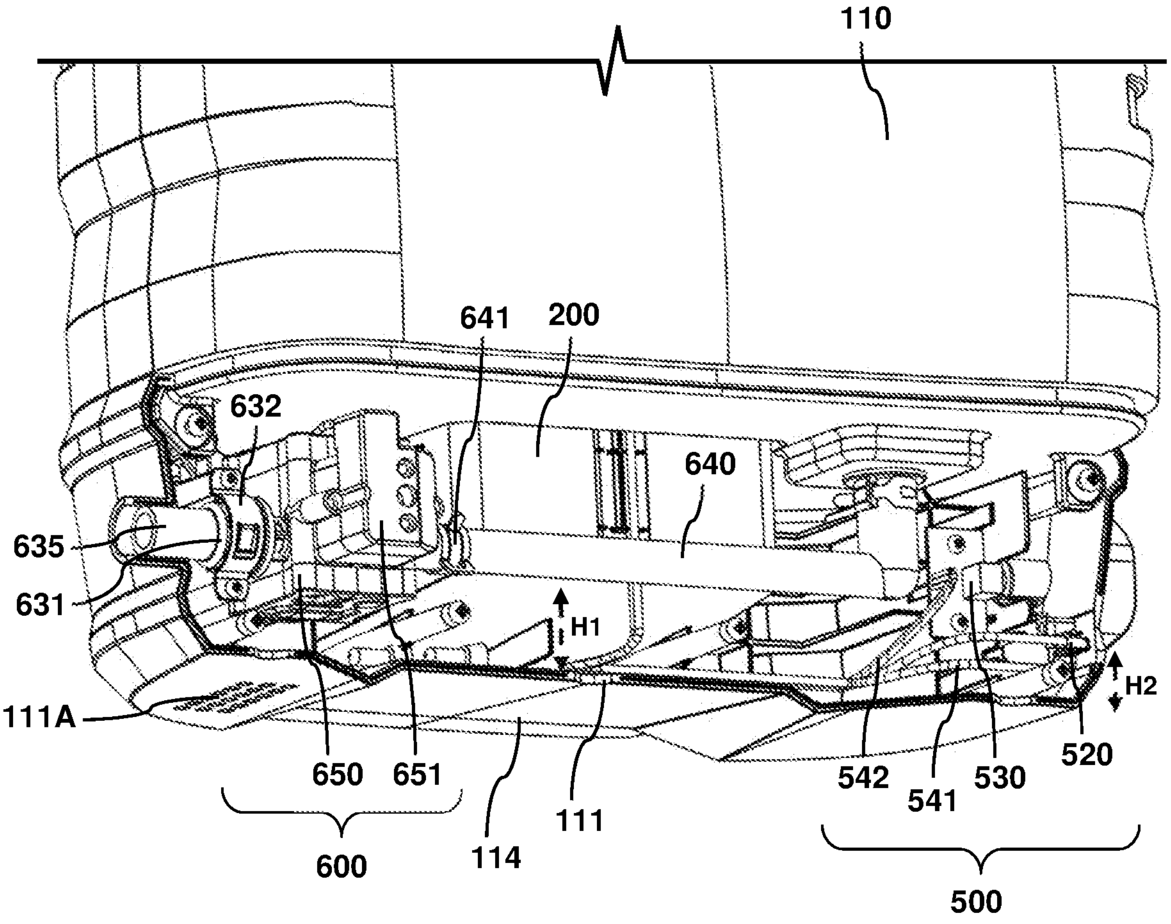
FIG. 21 is an internal rear perspective view of the chamber under the fluid container showing the control assembly and the pump assembly of the backpack sprayer of FIG. 1.

Referring to FIGS. 20 and 21, the chamber 130 of the backpack sprayer 100 is illustrated. The chamber 130 is positioned under the fluid container 110, and receives the control assembly 500 and the pump assembly 600. The configuration keeps the center of gravity of the backpack sprayer 100 low. Although in the illustrated embodiment, the control assembly 500 is positioned on the left end of the chamber 130, and the pump assembly 600 is positioned on the right end of the chamber 130, it is apparent that the positions and orientations thereof may be otherwise. Preferably, the control assembly 500 and the pump assembly 600 are positioned on the opposite ends within the chamber 130. The hose 430 of the dispensing assembly 400 is received by the chamber 130 and connected to the pump assembly 600. In certain embodiments, the width of the chamber 130 may be shorter than the width of the fluid container 110, such that the backpack sprayer 100 can be compact and lighter. The plurality of electric wires 541, 542 from the rotary sensor 530, and the switch 520 are connected to the motor 620 of the pump assembly 600, and the electronic control unit 250 of the battery compartment 200. Electric wires are not connected out of the housing 101, and so the dispensing assembly 400 does not have an electrical connection.

Figure 22:
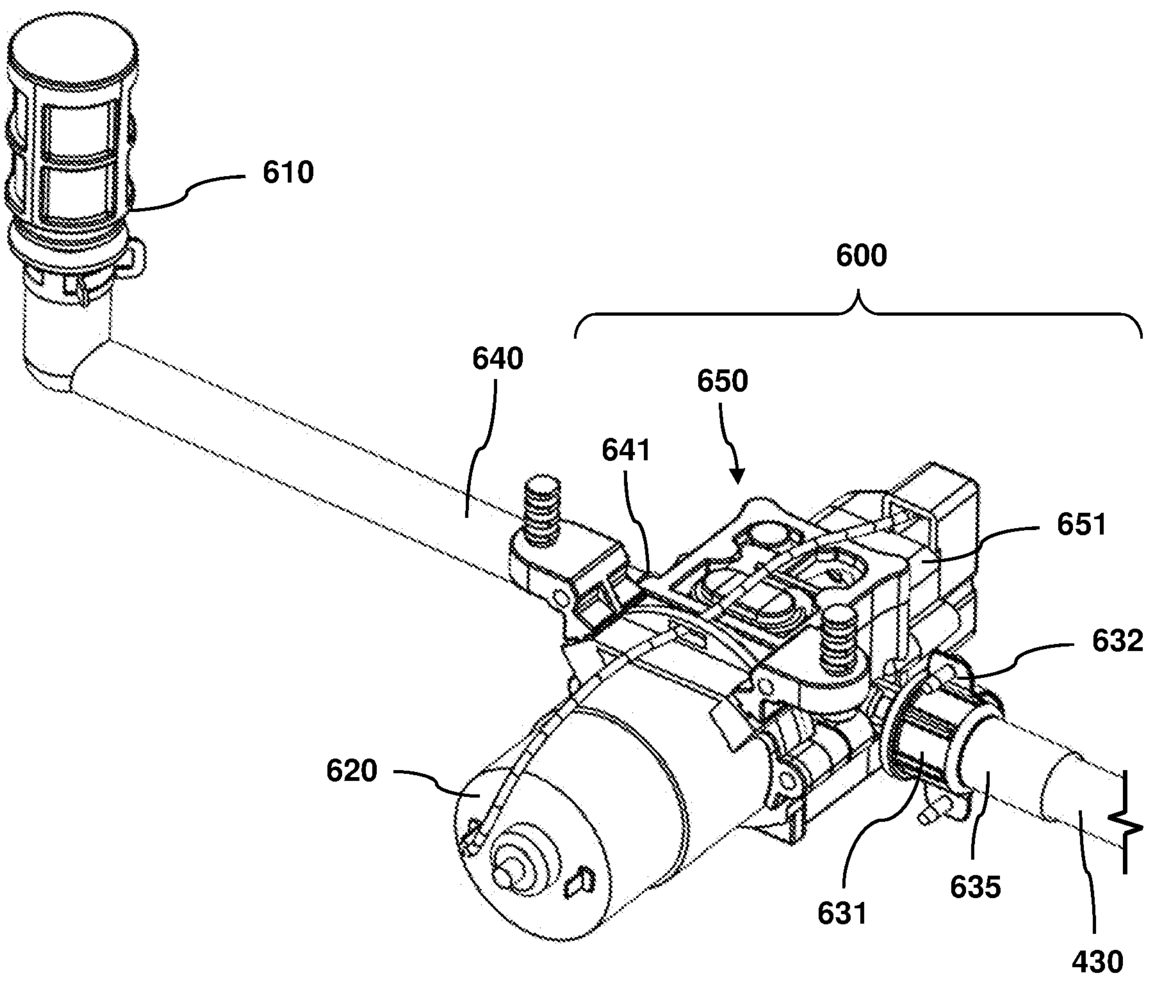
FIG. 22 is a perspective view of the pump assembly of the backpack sprayer of FIG. 1.

FIG. 22 shows the pump assembly 600 in accordance with certain embodiments of the present disclosure. The pump assembly 600 comprises one or more motors 620, and a pump 650 driven by the motor 620. The pump 650 is selected from a diaphragm pump, a vacuum pump, a centrifugal pump, a shuttle pump, a piston pump, a vane pump, or other hydraulic pumping devices known to those skilled in the art. The motor 620 can be any suitable electric motor selected from an alternating current (AC) motor, a brushed direct current (DC) motor, a brushless DC motor, a permanent magnet DC motor, and the like. For cooling down the pump assembly 600, a fan 651 may be provided.

The fluid for dispensing out is stored in the fluid container 110, and is in fluid communication with the pump assembly 600. For facilitating the fluid communication to the pump assembly 600, flow control devices such as valves, chokes, orifices, hydraulic connectors, and/or the like may be used. The pump assembly 600 may be connected to the fluid container 110 via any suitable numbers of liquid filters 610 and conduits 640. When the pump 650 is actuated, the fluid from the fluid container 110 enters the conduit 640 through the liquid filter 610. The pump 650 includes a pump inlet 641 and a pump outlet 635. The pump assembly further comprises a fluid passageway across the pump 650 and in fluid communication with the pump inlet 641 and the pump outlet 635. By electrically actuating the motor 620, the pump 650 is actuated to receive the fluid flowing into the pump 650 at the pump inlet 641 and pump the fluid by adjusting the pressure and flow rate to the pump outlet 635. The pressure and flow rate are adjusted by turning the rotatable dial 510 to adjust the value of the rotary sensor 530, by employing the Bernoulli's principle. The pump outlet 635 is connected to a hose 430 so that the dispensing assembly 400 is in fluid communication with the pump assembly 600.

Figure 23:
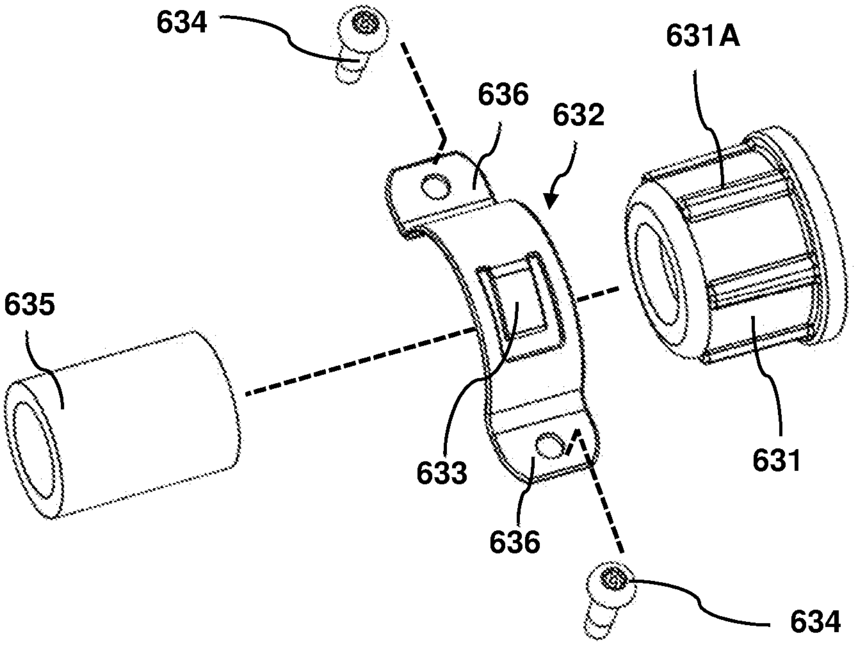
FIG. 23 is an exploded view of the threaded connection connecting the pump assembly to the dispensing assembly of the backpack sprayer of FIG. 1.

Advantageously, the present disclosure provides a threaded connection for securing the hose 430 to the pump outlet 635. The threaded connection comprises a thread connector 631 and a clamp 632 mounted onto the thread connector 631 for preventing the thread connector 631 from loosening. The exploded view of the threaded connection is shown in FIG. 23.

The thread connector 631 comprises a seal, an internally threaded inner wall, and a plurality of circumferentially arranged protrusions or dents 631A. The seal is a ring-shaped sealing element disposed within the thread connector 631. The internally threaded inner wall allows the thread connector 631 to be mounted between the dispensing assembly 400 and the pump assembly 600. The plurality of circumferentially arranged protrusions or dents 631A engages with a securing feature of the clamp 632. The clamp 632 is a semi-circular tab with a radial dimension close to the radial dimension of the thread connector 631. Therefore, the clamp 632 can circumferentially cover part of the thread connector 631. The clamp 632 further comprises one or more mounting ends 636 for mounting the clamp 632 to the housing 101 using screws 634, bolts, rivets, clamps, or any other suitable fastening devices.

Figure 24:
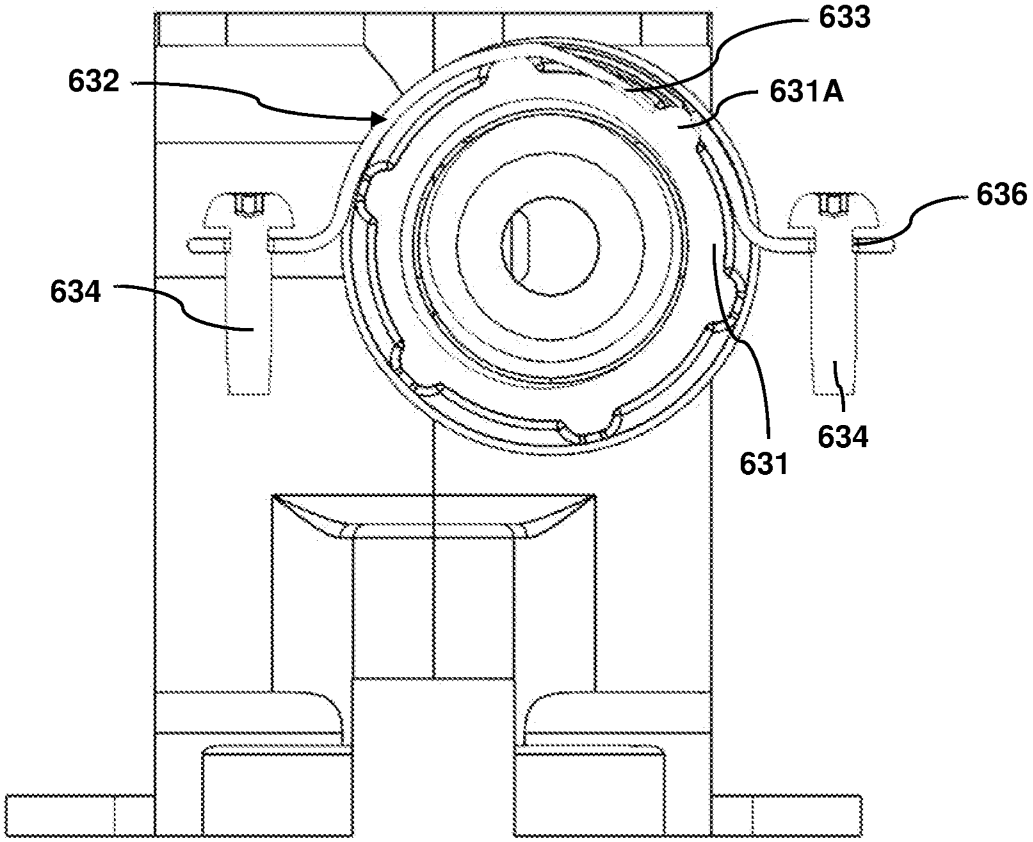
FIG. 24 is a cross-sectional front view of the threaded connection of the backpack sprayer of FIG. 1.

Referring to the cross-sectional view of the threaded connection 631 in FIG. 24, the securing feature of the clamp 632 comprises a bent tab 633. The bent tab 633 is bent inwardly and engages with any one of the plurality of circumferentially arranged protrusions or dents 631A. Therefore, the thread connector 631 can only be turned to further tighten the connection, but not towards the opposite direction for loosening the thread connector 631.

This illustrates the fundamental structure and mechanism of the battery-powered backpack sprayer in accordance with the present disclosure. It is apparent that the present disclosure may be embodied in other types of fluid dispenser without departing from the spirit or essential characteristics thereof. The present embodiment is, therefore, to be considered in all respects as illustrative and not restrictive. The scope of the disclosure is indicated by the appended claims rather than by the preceding description, and all changes that come within the meaning and range of equivalency of the claims are therefore intended to be embraced therein.

What is claimed is:

1. A backpack fluid dispenser comprising:

a housing comprising a bottom face and defining:

a fluid container;

a battery compartment for receiving a battery; and a chamber for receiving a control assembly and a pump assembly, wherein the control assembly comprises a rotatable dial having a cam surface for controlling on and off of the pump assembly; and a dispensing assembly for dispensing fluid from the fluid container, wherein:

the pump assembly is configured to pump the fluid from the fluid container to the dispensing assembly;

the control assembly is configured to control the pump assembly based solely on a rotational position of the rotatable dial;

the rotational position of the rotatable dial is detected based on a direct measurement of rotational movement of the rotatable dial independent of any translational motion of a shaft supporting the rotatable dial;

the battery compartment is positioned above the bottom face with a first height therebetween; and the control assembly is positioned above the bottom face with a second height therebetween.

2. The backpack fluid dispenser of claim 1, wherein the rotatable dial comprises a coupler for coupling a rotatory movement of the rotatable dial to a rotary sensor for controlling a flow rate of the pump assembly.

3. The backpack fluid dispenser of claim 2, wherein the rotary sensor is selected from a rheostat, a potentiometer, or an angular position sensor.

4. The backpack fluid dispenser of claim 1, wherein:

the cam surface comprises at least a first surface having a first radius and a second surface having a second radius different from the first radius;

a follower moves to a first position when engaging the first surface and opens a switch of the pump assembly; and the follower moves to a second position when engaging the second surface and closes the switch of the pump assembly.

5. The backpack fluid dispenser of claim 4, wherein the cam surface further comprises a transition surface between the first surface and the second surface.

6. The backpack fluid dispenser of claim 5, wherein the transition surface achieves an abrupt transition between the first surface and the second surface.

7. The backpack fluid dispenser of claim 4 wherein the follower is selected from a cantilever or a spring-loaded slider.

8. The backpack fluid dispenser of claim 1, wherein the dispensing assembly is in fluid communication with the pump assembly through a threaded connection, the threaded connection comprises a thread connector and a clamp mounted onto the thread connector preventing the thread connector from loosening.

9. The backpack fluid dispenser of claim 8, wherein the thread connector comprises a plurality of circumferentially arranged protrusions or dents for engaging with a securing feature of the clamp.

10. The backpack fluid dispenser of claim 9, wherein the securing feature comprises a bent tab.

11. The backpack fluid dispenser of claim 8, wherein the clamp is a semi-circular tab with one or more mounting ends for mounting the clamp to the housing.

12. The backpack fluid dispenser of claim 1, wherein the bottom face comprises one or more drain holes.

13. The backpack fluid dispenser of claim 1, wherein the control assembly and the pump assembly are positioned on the opposite ends within the chamber.

14. The backpack fluid dispenser of claim 1 wherein the battery compartment comprises a bottom compartment wall lifted from the bottom face of the housing for the first height.

15. The backpack fluid dispenser of claim 1, wherein the battery compartment comprises a compartment door with at least an opening at a lower end of the compartment door.

16. The backpack fluid dispenser of claim 1, further comprising an electronic control unit positioned on top of the battery compartment.

17. The backpack fluid dispenser of claim 1, wherein:

the battery compartment comprises a socket for slidingly receiving a battery in a receiving direction, and contact means for establishing an electrical connection between the battery and the backpack fluid dispenser, wherein the contact means are slidable within the socket along the receiving direction.

18. The backpack fluid dispenser of claim 17, wherein the contact means are slidable within the socket along to a first extent for electrical connection with a first battery of a first length, and to a second extent for electrical connection with a second battery of a second length.

19. A backpack fluid dispenser comprising:

a housing comprising a bottom face and defining:

a fluid container;

a battery compartment for receiving a battery; and a chamber for receiving a control assembly and a pump assembly, wherein the control assembly comprises a rotatable dial, wherein the rotatable dial comprises a cam surface engaged by a follower for controlling on and off of the pump assembly; and a dispensing assembly for dispensing fluid from the fluid container, wherein:

the pump assembly is configured to pump the fluid from the fluid container to the dispensing assembly;

the control assembly is configured to control the pump assembly;

the battery compartment is positioned above the bottom face with a first height therebetween;

the control assembly is positioned above the bottom face with a second height therebetween;

the cam surface comprises at least a first surface having a first radius and a second surface having a second radius different from the first radius;

the follower moves to a first position when engaging the first surface and opens a switch of the pump assembly; and the follower moves to a second position when engaging the second surface and closes the switch of the pump assembly.

20. A backpack fluid dispenser comprising:

a housing, wherein the housing comprising a bottom face and defining:

a fluid container spaced apart from the bottom face;

a battery compartment for receiving a battery;

a chamber for receiving a control assembly and a pump assembly; and one or more drain holes disposed in the bottom face to drain leaked liquid before the leaked liquid accumulates to enter the battery compartment; and a dispensing assembly for dispensing fluid from the fluid container, wherein:

the pump assembly is configured to pump the fluid from the fluid container to the dispensing assembly;

the control assembly is configured to control the pump assembly;

the battery compartment is positioned above the bottom face with a first height therebetween; and the control assembly is positioned above the bottom face with a second height therebetween.

* * * * *